United States Patent [19]
Possanza et al.

[11] Patent Number: 5,404,866
[45] Date of Patent: Apr. 11, 1995

[54] KETTLE INSERT PASSIVE LIQUEFACTION

[75] Inventors: Steven D. Possanza, Penfield, N.Y.; Kenneth A. Nicolai; Gary G. Kirkpatrick, both of Fort Collins, Colo.

[73] Assignee: Eastman Kodak Company, Rochester, N.Y.

[21] Appl. No.: 136,351

[22] Filed: Oct. 13, 1993

[51] Int. Cl.6 .............................................. F24H 1/00
[52] U.S. Cl. ............................ 126/343.5 A; 165/169; 422/285
[58] Field of Search ................. 126/343.5 R, 343.5 A; 165/169; 422/285, 901

[56] References Cited

U.S. PATENT DOCUMENTS

| | | | |
|---|---|---|---|
| 2,130,455 | 9/1938 | Cain | 126/343.5 A |
| 3,396,027 | 8/1968 | McFall et al. | 96/94 |
| 3,425,835 | 2/1969 | Johnson et al. | 96/94 |
| 3,606,290 | 9/1971 | Ranson | 266/22 |
| 4,032,288 | 6/1977 | Numerowski | 126/343.5 A |
| 4,036,594 | 7/1977 | Ibing et al. | 23/264 |
| 4,161,391 | 7/1979 | Parker | 126/343.5 A |
| 4,307,055 | 12/1981 | Takeda et al. | 264/178 |
| 4,379,836 | 4/1983 | Schnoring et al. | 430/377 |
| 4,505,669 | 3/1985 | Rodgers | 126/343.5 A |
| 5,182,190 | 1/1993 | LeFaou | 430/546 |

FOREIGN PATENT DOCUMENTS

WO89/06829 7/1989 WIPO.
WO09/09007 5/1992 WIPO.

Primary Examiner—Carroll B. Dority
Attorney, Agent, or Firm—Carl F. Ruoff

[57] ABSTRACT

The present invention is a cone insert for a liquefaction kettle. Pads on the bottom of the cone separate the cone from the surface of the kettle. Solid material is added to the top of the cone. Solid material is melted on demand by an internal spray kettle ring. The cone insert provides continuous liquefaction and prevents sensitometric shift in photographic emulsions.

2 Claims, 2 Drawing Sheets

KETTLE INSERT PASSIVE LIQUEFACTION

FIELD OF THE INVENTION

The present invention relates to an apparatus for the liquefaction of gelled substances and, more particularly, to an apparatus for continuously liquefying gelled photographic material.

BACKGROUND OF THE INVENTION

In the manufacture of photographic film and paper, the liquefaction of gelled materials is required prior to coating these materials on the film or paper. Gelled photographic materials include aqueous or solvent based photosensitive or non-photosensitive emulsions and dispersions.

There are two general methods that are known for liquefying gelled photographic materials: batch liquefaction; and continuous liquefaction. Batch liquefaction utilizes a jacketed kettle fitted with a stirring device. Heat is provided to the vessel through hot water or steam. The jacket system also provides chilled water for cooling. The jacket generally utilizes spray rings and operates under thin film heat transfer conditions. Jackets may also operate under flooded conditions although it is less common.

Continuous liquefaction may be dynamic or passive. In dynamic continuous liquefaction, gelled material is forced into a heat exchanger by means of an auger and/or positive displacement pump. The system may include a vacuum chamber to remove air from the solid gelled material. Material is liquefied in the heat exchanger and conveyed to the coating station. Examples of continuous liquefaction devices are found in U.S. Pat. No. 5,182,190, PCT Publication WO 89/06829 and PCT Publication WO 92/09007.

Dynamic continuous liquefaction equipment may damage or alter photographic materials due to mechanical energy from the pump or auger. Additionally, the close tolerance pumps typically used in dynamic liquefaction applications are subject to damage from foreign materials which may be present in the photographic materials, and will reduce overall machine reliability.

Passive continuous liquefaction typically uses a flat coil or heating grid to liquefy material at the required coating rate. Liquefied gelatin passes through gaps between the coil or grid and is collected in a low volume reservoir. The reservoir may include an ultrasonic horn to enhance debubbling. The liquid level in the reservoir is monitored and used to control the heating rate of the coil or grid to maintain a constant rate of liquefaction. An example of such a passive liquefaction device can be found in U.S. patent application Ser. No. 07/815,462, now abandoned.

There exists a need to use both conventional and passive liquefaction technology in the same vessels so as to accommodate a wide range of product and production conditions. The coil type technology does not readily meet those needs. There also are concerns around the ability to rapidly clean the coil to accommodate rapid changes in product type. The present invention provides the advantages of passive liquefaction while utilizing existing vessels in a manner which accommodates both rapid product changes and allows changes between continuous and batch type operations.

SUMMARY OF THE INVENTION

The present invention is a device adapted for use in a kettle, the kettle having a volume bounded by a heatable wall and a drainage surface. The device comprises an insert positionable within the volume of the kettle, the insert having an outer surface and pads attached to the outer surface of the insert. When the insert is positioned within the volume of the kettle, the outer surface of the insert is spaced apart from the wall and the drainage surface by the pads to form a gap such that when solid meltable material is placed in the kettle containing the insert and the walls are heated, the material is melted and flows between the gap to the drainage surface.

For a better understanding of the present invention together with other objects, advantages and capabilities thereof, reference is made to the following description and dependent claims in connection with the above described drawings.

DESCRIPTION OF THE PREFERRED EMBODIMENT

The present invention relates to an apparatus for continuously liquefying gelled photographic materials. The present invention includes a device which is inserted into a cone bottom jacketed vessel. The outer surface of the device is angled to divert solid gel material to the heated kettle wall, and spaced apart from the heated kettle wall to allow the solid gel material to fall between the kettle wall and device without bridging. The bottom of the device is fitted with pads to form a gap such that the liquefied material flows through the gap while solid material is retained in the upper portion of the vessel.

The level sensor is located at the bottom of the vessel. A low volume reservoir of liquid is maintained within the bottom of the vessel to facilitate deaeration. Low volume greatly reduces sensitometric drift typically associated with long residence times in batch operations. The temperature and/or flow rate of the heating fluid to the jacket spray ring is controlled to maintain a constant level, thereby providing continuous liquefaction at the system coating rate.

Such a device allows ready adaptation of conventional batch style jacketed kettles to a continuous liquefaction process. All surfaces in contact with the solid or liquefied gelatin materials are smooth making them readily cleanable. The device is easily installed and removed and requires no additional utility connections by the operator.

Figure 1:
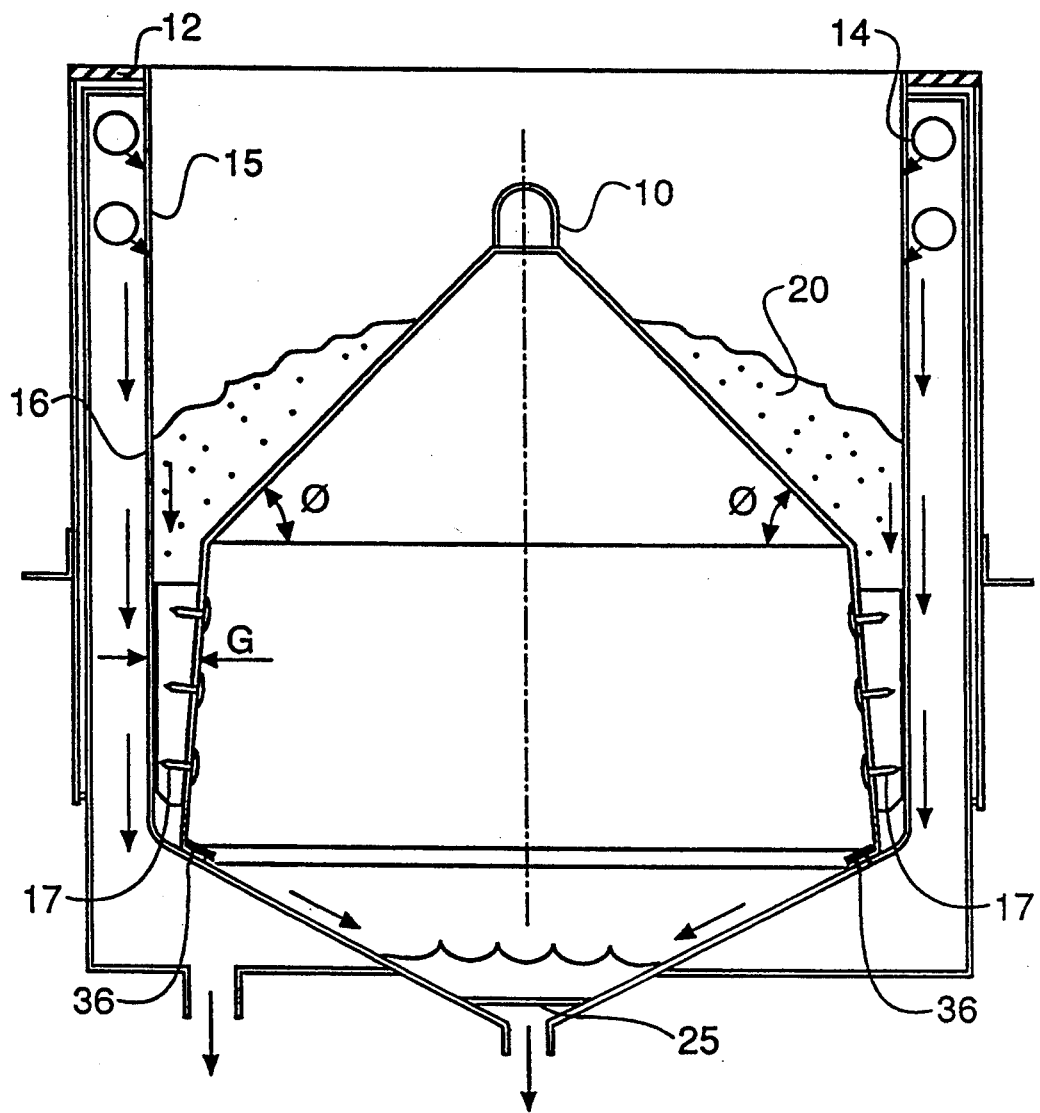
FIG. 1 shows a cross section of a jacketed vessel within the kettle insert.

FIG. 1 shows a cross-sectional view of the insert 10 in a kettle 12. The wall 15 of the kettle 12 includes at least one water spray ring 14 from which hot water is sprayed onto the outer surface 16 of wall 15. Chilled granular or chunked photographic material 20 is added to the vessel 12 by any suitable means. The upper portion of the insert 10 is cone shaped and has an angle $\phi$ which is greater than the angle of repose of the photographic material. This causes the material 20 to migrate towards the jacketed vessel wall 15. The angle of the lower portion of the cone 10 leaves a gap or space G between the wall of the insert and the wall 15 of the vessel to prevent bridging, but is as steep as possible to minimize remaining solids when the solids level becomes insufficient to support an adequate liquefaction rate. The parameters, $\phi$ and G, are dependent on the size of the chilled gelled chunks, the flow and heat transfer requirements for this specific application.

A sensing device 25 monitors the level of the liquid in the lower portion of the kettle 12. This sensing device 25 can be a bubble tube, strain gauge, pressure transducer or other suitable liquid level transmitter. The flow rate of the tempered water to the spray ring 14 is controlled to maintain a relatively constant liquid level, typically 15 liters, and a constant rate of liquefaction. Pads 36, shown in FIG. 1, are fixed to the bottom of the insert which create a gap that allows the liquid to flow to the lower portion of the kettle while retaining solids in the upper portion of the vessel. These pads require spacing that is typically on the order of about 0.062 to 0.125 inches. Gudgeons or pads 17 align the insert during installation, and prevent lateral movement of the insert during operation. The spray ring 14 depicted in FIG. 1 is at the top of the jacket, however, the spray ring could be located closer to the bottom of the jacket to reduce varying heat transfer due to changing solids level. Locating the spray ring near the top of the jacket allows for maximum possible liquefaction rates.

Figure 2:
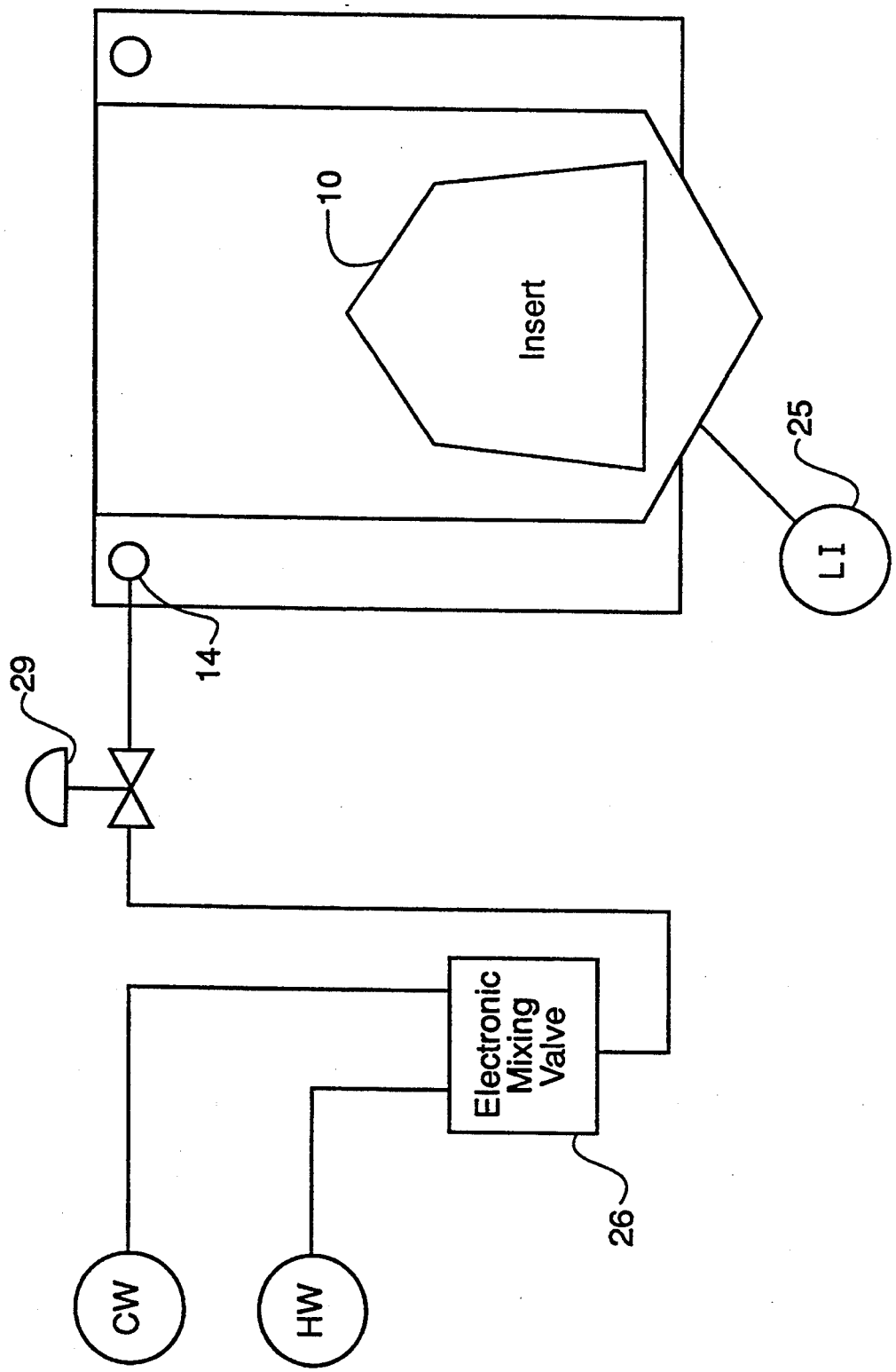
FIG. 2 is a schematic diagram showing the passive liquefaction process.

FIG. 2 shows a schematic of the system described. Tempered water is provided at a controlled temperature, typically between 105° Fahrenheit and 140° Fahrenheit, through an electronic mixing valve 26. Although FIG. 2 depicts the use of a controllable mixing valve 26 to provide the tempered water, any tempering system will suffice. The flow of the tempered water to the spray ring 14 is controlled by flow control valve 29. The control of valve 29 is determined by level indicator 25.

A kettle having a working volume of approximately 1400 liters was filled with an insert of the present invention. When the insert was installed the working volume of the kettle was reduced to between 600 and 700 liters. The gap between the insert and the kettle wall ranged from approximately 2 inches at the lower portion of the insert to approximately 4 inches. The angle $\phi$ of the upper portion of the insert was 45°. The following table shows the results of the insert and kettle.

| Viscosity | Gel % | Maximum Flow Rate | Maximum Jacket Temp. |
| --- | --- | --- | --- |
| 70 | 12–14 | 7 l/min | 150° F. |
| 70 | 12–14 | 5 l/min | 135° F. |
| 16 | 6 | 5 l/min | 125° F. |
| 16 | 6 | 3.5 l/min | 110° F. |

While there has been shown and described what are present considered to be the preferred embodiments of the invention, it will be apparent to those skilled in the art that various changes and modifications can be made herein without departing from the scope of the invention as defined by the appended claims.

What is claimed is:

1. An apparatus comprising:
 a kettle having a volume bounded by a heatable wall and a drainage surface;
 a spray ring for heating the heatable wall;
 an insert positionable within the volume of said kettle, said insert insertable and removable from kettle without support or utility disassembly, said insert having a conical upper section, a lower section, and an unheated outer surface; and
 pads attached to the outer surface of said insert;
 wherein when said insert is positioned within the volume of said kettle, the outer surface of said insert is spaced apart from the heatable wall and the drainage surface by said pads to form a gap such that, when solid meltable material is placed in the kettle containing said insert and the wall is heated, the material is melted and flows between the gap to the drainage surface.

2. The device according to claim 1 wherein said pads are integral with the outer surface of said insert.

* * * * *